US009069698B2

(12) United States Patent
Osborn et al.

(10) Patent No.: US 9,069,698 B2
(45) Date of Patent: Jun. 30, 2015

(54) CHANNEL ROTATING ERROR CORRECTION CODE

(75) Inventors: Michael J. Osborn, Hollis, NH (US); Mark D. Hummel, Franklin, MA (US); David E. Mayhew, Northborough, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 217 days.

(21) Appl. No.: 13/605,218

(22) Filed: Sep. 6, 2012

(65) Prior Publication Data
US 2014/0068373 A1 Mar. 6, 2014

(51) Int. Cl.
*G11C 29/00* (2006.01)
*H03M 13/00* (2006.01)
*G06F 11/10* (2006.01)
*H04L 1/00* (2006.01)

(52) U.S. Cl.
CPC ........... *G06F 11/1048* (2013.01); *H04L 1/0045* (2013.01); *G06F 11/1076* (2013.01); *H04L 1/0041* (2013.01)

(58) Field of Classification Search
CPC ... H04L 1/0045; H04L 1/0041; H04L 1/0057; H03M 13/095; G06F 11/1012; G06F 11/1016; G06F 11/1048; G06F 11/1068; G06F 11/1076; G06F 11/108; G11B 20/1803
USPC ......... 714/701, 712, 752, 758, 766, 769, 770, 714/771, 773, 777, 799, 800, 820, 821
See application file for complete search history.

(56) References Cited

U.S. PATENT DOCUMENTS

| 5,463,643 | A | 10/1995 | Gaskins et al. |
| 6,738,935 | B1 * | 5/2004 | Kimmitt ................. 714/701 |
| 6,826,778 | B2 * | 11/2004 | Bopardikar et al. ......... 725/145 |
| 7,684,510 | B2 * | 3/2010 | Lee et al. ................. 375/267 |
| 2012/0173936 | A1 | 7/2012 | Johnson et al. |

FOREIGN PATENT DOCUMENTS

JP 2012113476 A 6/2012

OTHER PUBLICATIONS

International Search Report & Written Opinion in related international patent application No. PCT/US13/56557, mailed on Apr. 16, 2014; 17 pages.

* cited by examiner

*Primary Examiner* — Christine Tu
(74) *Attorney, Agent, or Firm* — Park, Vaughan, Fleming & Dowler LLP (57) ABSTRACT

A write or read method for use in a computer having multiple channels of memory includes writing or reading data to or from one channel in the memory, and simultaneously in parallel writing or reading an error correction code corresponding to the data to or from a different channel in the memory.

15 Claims, 6 Drawing Sheets

CHANNEL ROTATING ERROR CORRECTION CODE

FIELD OF THE INVENTION

The present invention relates generally to methods of providing and controlling digital memory error detection and correction during write and read operations to and from memory modules and more particularly to handling error correction operations during write and read operations to and from memory.

BACKGROUND

Computer systems manipulate and transfer data in memory devices such as, but not limited to, random access memory (RAM), dynamic random access memory (DRAM), static random access memory (SRAM), etc.

Error correcting code (ECC) memory such as DRAM can detect and correct the most common types of internal data corruption. ECC memory maintains a memory system effectively free from single-bit errors where the data read from each word is always the same as the data that had been written to it, even if a single bit has been stored or, in some cases, has been flipped to the wrong state.

Certain computer systems are designed to meet requirements for large arrays of memory along with a high level of data integrity within the system. For these systems, standard DRAM memory with ECC is often not the best choice due to constraints such as high costs, design limitations and/or non-availability of error correction in memory modules.

Another consideration in computer system design is the channel bandwidth which generally defines the net bit rate, channel capacity, or maximum throughput of a communication path, such as across a digital communication network, or to and from memory channels in a computer. A large bandwidth is desirable and sometimes necessary for transmitting and receiving large quantities of data.

Currently available DRAM memory used in computer systems includes error correction code capability so when data packets are transferred over a network and received at a computer, that computer will most likely have DRAM memory with ECC to ensure data integrity. However as implied above, some computers requiring high storage capacity and bandwidth are better served using TSV-DRAM memory. Of course for any computer system some form of data correction is essential for accurate data storage and recall.

Some computer systems requiring a high level of data integrity necessitate the use of error detection and correction on large arrays of memory. However, if a system design cannot utilize DRAM with ECC logic due to cost, design limitations or availability, then other methods must be used to ensure data integrity.

One method of implementing data correction into a computer system that uses other than standard DRAM-ECC memory chips and logic is to implement ECC logic into a memory controller and store the error correction code along with the data on the DRAM module. However, this method requires two accesses for every write and read: one access to write or read the data, and a second access to write or read the ECC value. This dual write/read requirement effectively has the deleterious effect of cutting the bandwidth of the DRAM channel in half

BRIEF SUMMARY OF EMBODIMENTS

It is an object of the present invention to provide a computer system having improved error correction and improved bandwidth. It is another object of the invention to provide an improved method and system for implementing data correction into a computer system that uses other than standard DRAM-ECC memory chips and logic. It is yet another object of the present invention to provide such a system which maintains a broad bandwidth capability.

In accordance with an aspect, a general write or read method for use in a computer having multiple channels of memory includes writing or reading data to or from one channel in the memory, and simultaneously in parallel writing or reading an error correction code corresponding to the data to or from a different channel in the memory.

In accordance with an aspect, a method for writing data to a multiple channel memory module includes the steps of: (a) setting a start value of n for $0 \leq n \leq (m-1)$ for the multi-channel memory module having m channels where n and m are integers greater than and equal to zero and m is at least 1 greater than n; (b) writing data DATn to a channel CHn of the memory module; (c) if n=m−1, then simultaneously writing in parallel an error correction code ECCn corresponding to DATn to another channel CH(start) of the memory module; (c1) if writing of the data is complete, then ending; (c2) if writing of the data is incomplete, then resetting n to a different start value and returning to step (b); (d) if n≠m−1, then simultaneously writing in parallel an error correction code ECCn corresponding to DATn to another channel CH(n+1) of the memory module; (e) incrementing n=n+1; and (f) returning to (b).

In accordance with an aspect, a method for reading data from a multiple channel memory module includes the steps of: (a) setting $0 \leq n \leq (m-1)$ for the multi-channel memory module having m channels where n and m are integers greater than and equal to zero and m is at least 1 greater than n; (b) reading the data DATn from a channel CHn of the memory module; (c) if n=m−1, then simultaneously reading in parallel an error correction code ECCn corresponding to DATn from another channel CH(0) of the memory module; (c1) if reading of the data is complete, then ending; (c2) if reading of the data is incomplete, then resetting n to a different start value and returning to step (b); (d) if n≠m−1, then simultaneously reading in parallel an error correction code ECCn corresponding to DATn from another channel CH(n+1) of the memory module; (e) incrementing n=n+1; and (f) returning to step (b).

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
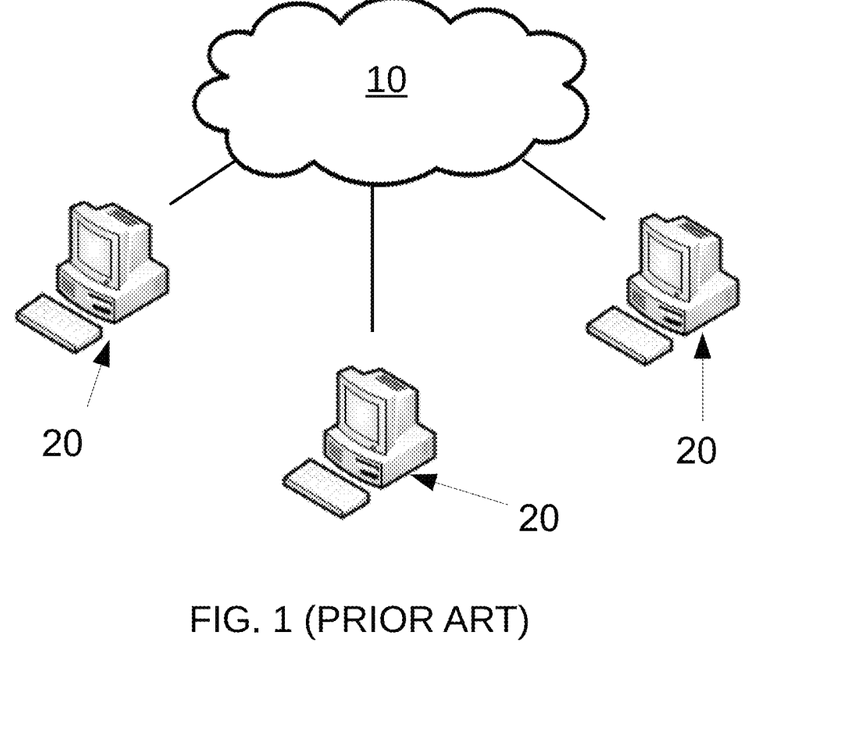
FIG. 1 is a prior art diagram of a digital network.

FIG. 1 is a diagram of a standard digital communications network 10 including computers 20. The network 10 represents any digital communications network such as the Internet, Ethernet, or a local area network LAN. Each of the computers 20 connected to the network 10 will have some type of memory such as RAM, DRAM, SRAM, TSV-DRAM, etc.

Figure 2:
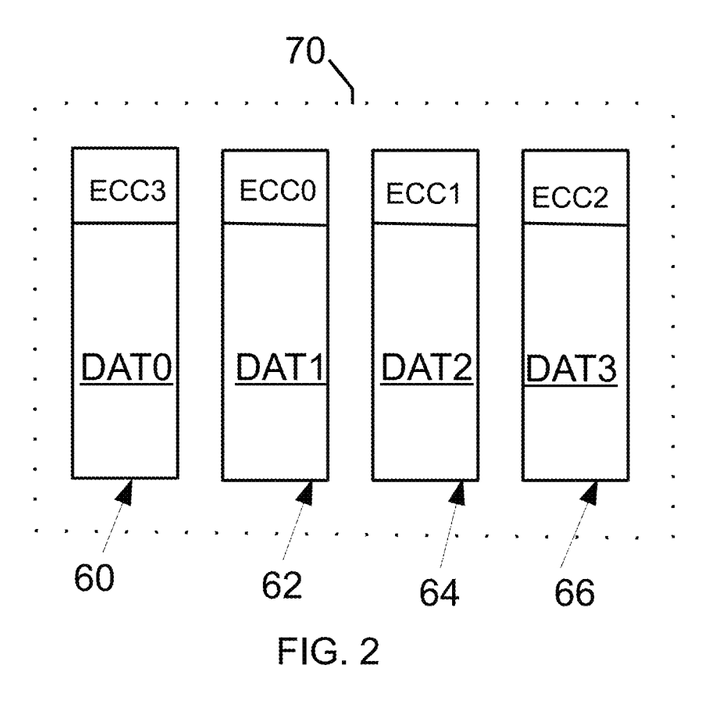
FIG. 2 is a diagram representing a portion of a TSV-DRAM multi-channel memory module in accordance with the principles of the invention.

A computer system and method for use with large arrays of memory with increased bandwidth such as DRAM memory (which does not include error correction code) is explained as follows in conjunction with FIGS. 2 through 6. In FIG. 2 a portion of a DRAM memory module 70 is shown having multiple memory channels 60, 62, 64 and 66. Although only four memory channels are depicted, in practice a memory module 70 may have 8, 16, 32 or any other number of memory channels limited only by design or specific application restrictions. The error correction codes are labeled ECC0, ECC1, ECC2, and ECC3. The payload or data areas are labeled as DAT0, DAT1, DAT2 and DAT3. DRAM memory module 70 may include die stacked memory which, in an embodiment, may enable communication between stacked memory dies through the use of through-silicon vias (TSVs). In the exemplary embodiments, such die stacked DRAM memory will be referred to as TSV-DRAM, although other DRAM memory could also be employed.

Figure 3:
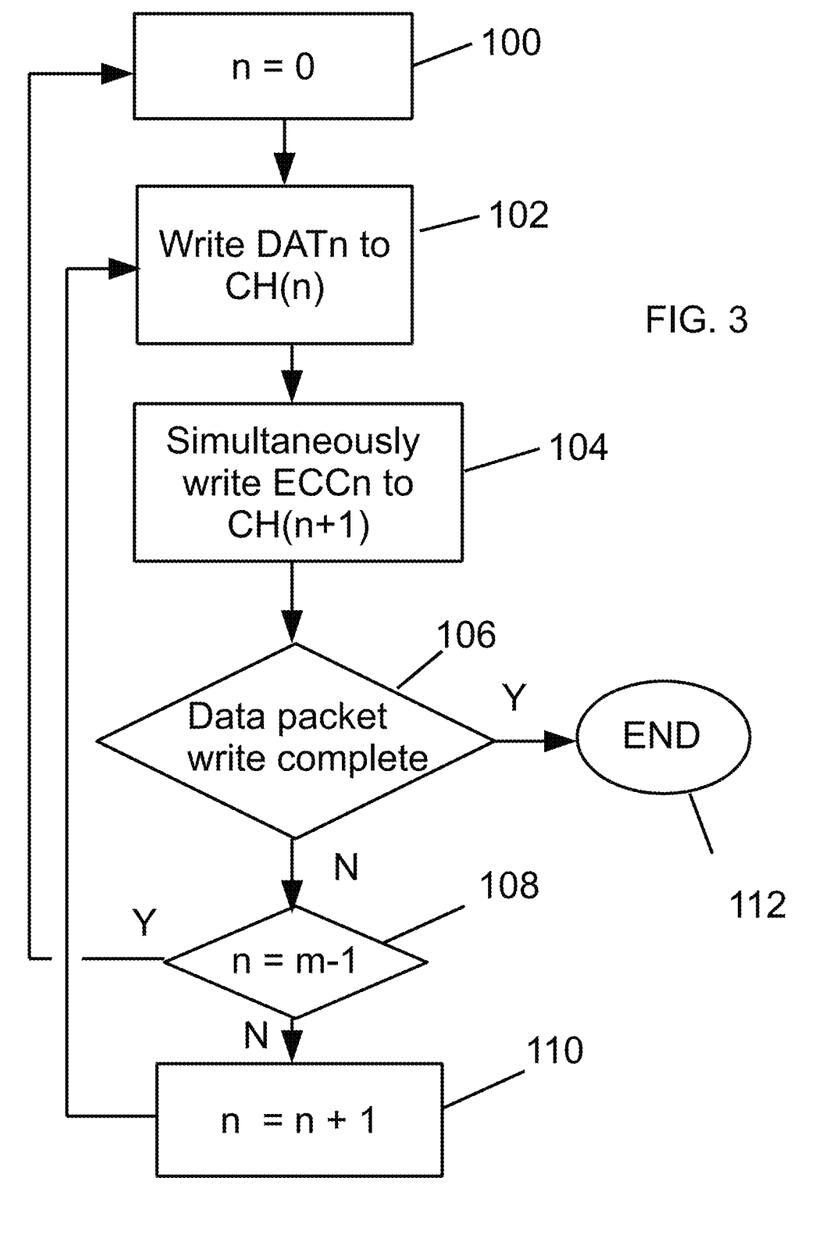
FIG. 3 is a flowchart of a first preferred write embodiment of a method for controlling digital memory error detection and correction during a write operation to a multi-channel memory in accordance with the principles of the invention.

FIG. 3 is a flowchart of a first preferred write embodiment of a method for controlling digital memory error detection and correction during a write operation to a multi-channel memory. In this example n and m are integer values including 0, where m equals the number of memory channels of a memory device such as a TSV-DRAM memory module and n is initially set equal to 0. If we use this method in conjunction with FIG. 2 then for n=0 and m=3, there are 3 memory channels and the default starting value is n=0.

First data DAT0 has a corresponding first error correction code ECC0, second data DAT1 has a corresponding second error correction code ECC1, third data DAT2 has a corresponding third error correction code ECC2, and fourth data DAT3 has a corresponding fourth error correction code ECC3. Note that the first data DAT0 is written to the first channel 60 (CH0) and the first error correction code ECC1 is written to the second channel 62 (CH1). Similarly, the second data DAT1 is written to the second channel 62 (CH1) and the second error correction code ECC1 is written to the third channel 64 (CH2); the third data DAT2 is written to the third channel 66 (CH2) and the third error correction code ECC2 is written to the fourth channel 68 (CH3). Finally, the fourth data DAT3 is written to the fourth channel 68 (CH3) and the fourth error correction code ECC3 is written to the first channel 60 (CH0).

FIG. 3 is directed towards writing data starting with a default value of n=0. The default starting value n=0 for writing data is selected in step 100 corresponding to a first channel CH(0). In step 102, DATn is written to channel CH(n) then the error correction code corresponding to DATn is written (step 104) in parallel simultaneously to another channel CH(n+1). Step 106 queries whether the writing process is complete. If YES, then the process ends in step 112. If NO, then step 108 determines whether n=m−1. If n does equal m−1, then the process returns to step 100 where n is initialized to 0. If n does not equal m−1, then n is incremented in step 110 and the writing process continues in step 102.

Figure 4:
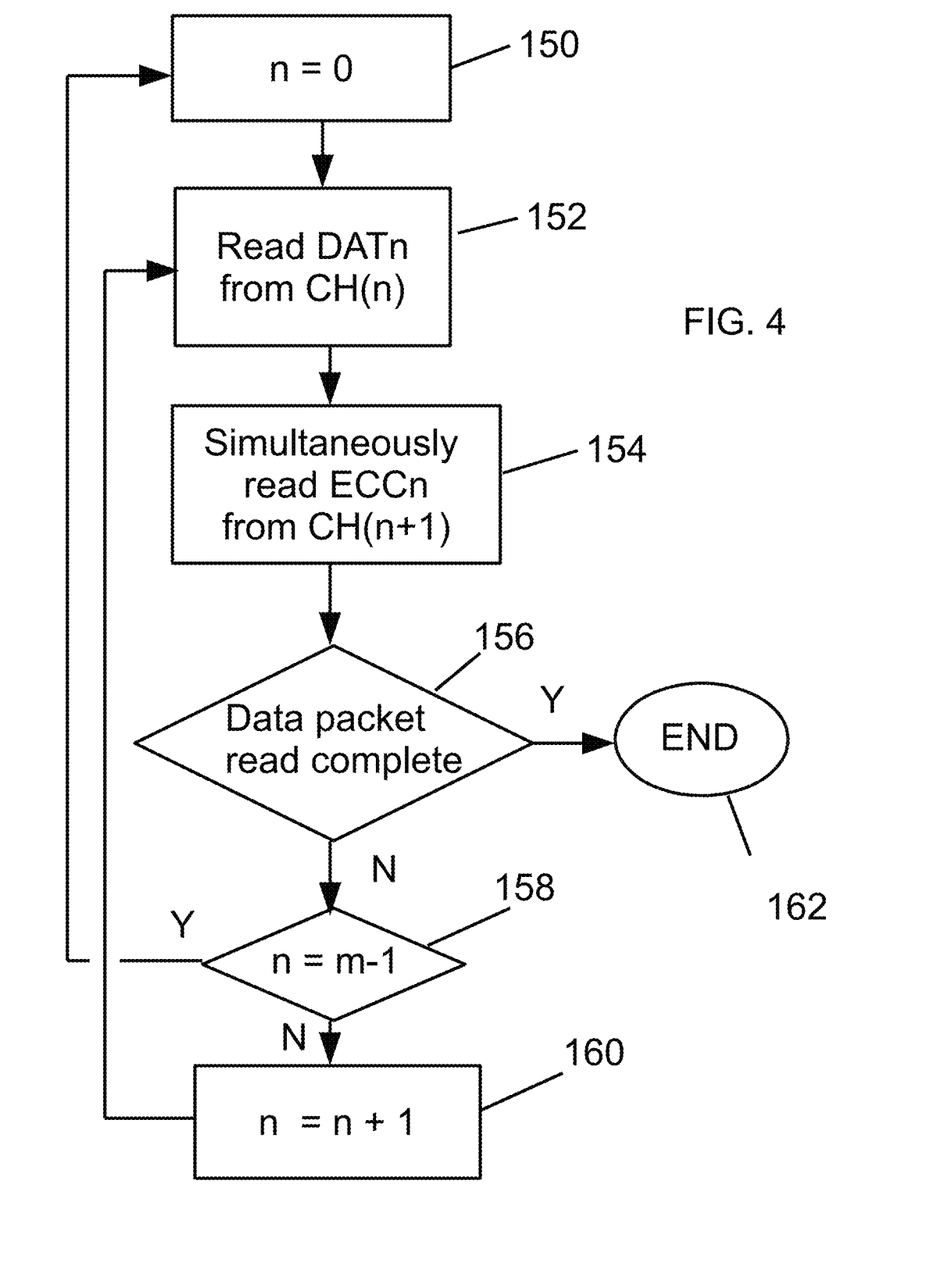
FIG. 4 is a flowchart of a first preferred read embodiment of a method for controlling digital memory error detection and correction during a read operation from a multi-channel memory in accordance with the principles of the invention.

FIG. 4 is a flowchart of a first preferred read embodiment of a method for controlling digital memory error detection and correction during a read operation to a multi-channel memory. The starting value for reading data is selected in step 150 as n=0 corresponding to a first channel CH(0). In step 152, DATn is read from channel CH(n) then the error correction code corresponding to DATn is read (step 154) in parallel simultaneously from another channel CH(n+1). Step 156 queries whether the writing process is complete. If YES, then the process ends in step 162. If NO, then step 158 determines whether n=m−1. If n does equal m−1, then the process returns to step 150 where n is initialized to 0. If n does not equal m−1, then n is incremented in step 160 and the writing process continues in step 152.

Figure 5:
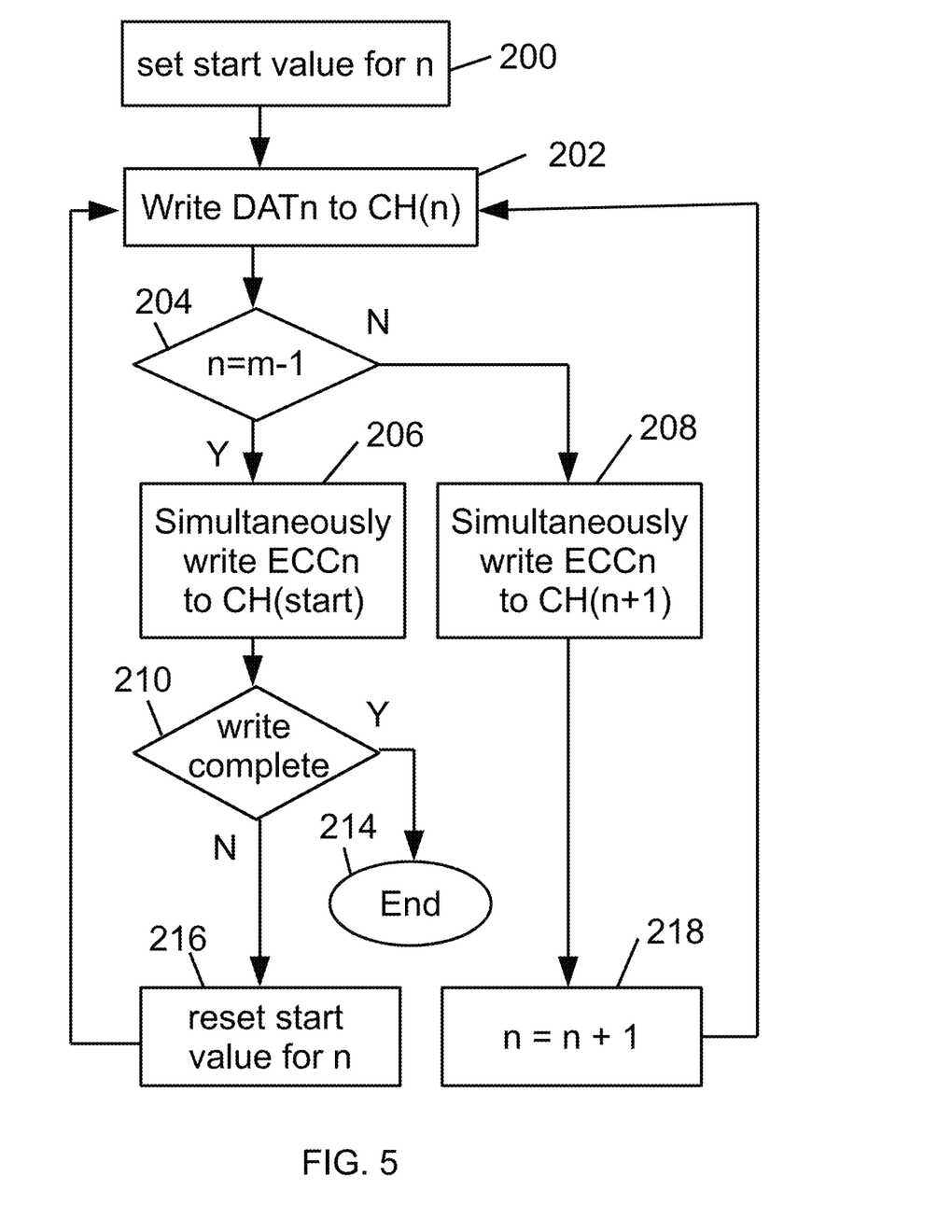
FIG. 5 is a flowchart of a second preferred write embodiment of a method for controlling digital memory error detection and correction during a write operation to a multi-channel memory in accordance with the principles of the invention.

A second write embodiment for controlling digital memory error detection and correction during a write operation is outlined by the flowchart of FIG. 5. Often it may be beneficial to start writes at different channels within the memory to prevent wear, to improve bandwidth, and for better data organization. In FIG. 5 we have a multi-channel memory module having m−1 channels of memory where n equals an arbitrary starting value "start" and start≠0. The starting value n for writing to the memory will be varied on each write cycle in contrast to the write process of FIG. 3 where the default starting value for n is always 0.

Step 200 sets a starting value start=n for 0≤n≤(m−1) where n and m are both integer values greater than or equal to 0, and m is at least 1 greater than n. In step 202 DATn is written to memory channel CH(n). It is determined in step 204 whether n equals m−1. If YES, then the error correction code ECCn corresponding to DATn is simultaneously written in parallel in step 206 to channel CH(start) where start is the initial value of n for this write cycle. If NO, then the error correction code is written in step 208 to channel CH(n+1). Note that although the operations of steps 202, 204, 206 and 208 appear sequential on the flowchart, in practice the algorithm is established so that these operations occur simultaneously so that there are simultaneous parallel writes to two separate channels during any given write operation. One part of a write operation writes data to one channel, and the other part of the same write operation simultaneously writes the ECC code corresponding to that data to another channel.

If the ECCn was written to CH(start) in step 206, then step 210 determines if the writing operation is complete. If YES, then the process ends in step 214. If the writing operation is not complete in step 210, then n is reset to another arbitrary or predetermined start value in step 216 and the writing process continues in step 202. If the ECCn was simultaneously written in parallel to CH(n+1) in step 208, then n is incremented in step 218 and the write operation continues again at step 202.

The change in the starting value "start" for n for each additional write sequence can be arbitrary or following a specific sequence according to a specific algorithm or pattern, so long as the start value changes between write cycles. In general the reason for altering the start value of n is to maintain or expand channel bandwidth while concurrently providing a more even use of the memory channels. The use of multiple channel bandwidth over single channel bandwidth provides improved communications speed in transfer of data to or from memory.

Figure 6:
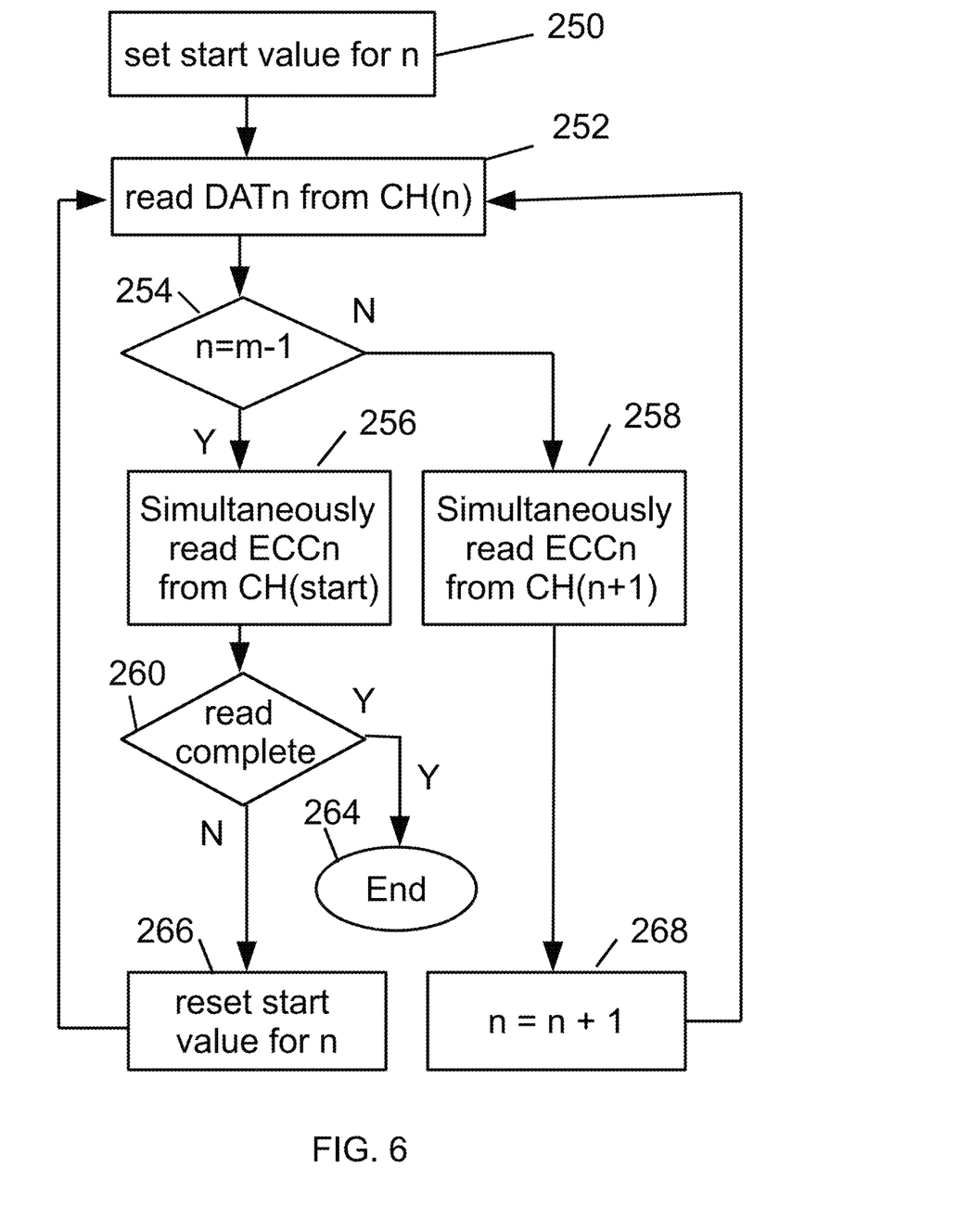
FIG. 6 is a flowchart of a second preferred read embodiment of a method for controlling digital memory error detection and correction during a read operation from a multi-channel memory in accordance with the principles of the invention.

A second read embodiment for controlling digital memory error detection and correction during a read operation is outlined by the flowchart of FIG. 6. Here we again have a multi-channel memory module having m−1 channels of memory where n equals a starting value "start" and start≠0. The starting value n for reading from memory will be varied on each read cycle in contrast to the read process of FIG. 4 where the default starting value for n is always 0.

Step 250 sets a starting value "start"=n for 0≤n≤(m−1) where n and m are both integer values greater than or equal to 0 and m is at least 1 greater than n. In step 252 DATn is read from memory channel CH(n). It is determined in step 254 whether n equals m−1. If YES, then the error correction code ECCn corresponding to DATn is simultaneously read in parallel in step 256 from channel CH(start) where "start" is the initial value of n for this read cycle. If NO, then the error correction code is simultaneously read in parallel in step 258 from channel CH(n+1). Note that although the operations of steps 252, 254, 256 and 258 appear sequential on the flowchart, in practice the algorithm is established so that these operations occur simultaneously so that there are simultaneous parallel reads from two separate channels during any given read operation. One part of a read operation reads data to one channel, and the other part of the same read operation simultaneously reads the ECC code corresponding to that data from another channel.

If the ECCn was read from CH(start) in step 256, then step 260 determines if the read operation is complete. If NO in step 262, then n is incremented in step 268 to n=n+1 and the reading process continues in step 252. If the read operation is deemed complete in step 260, then the process ends in step 264. If the ECCn was read from CH(n+1) in step 258, then n will be incremented in step 268 and the read operation will continue in step 252.

As with the write operation described above, the change in the start value of n for each additional read sequence can be arbitrary or following a specific sequence according to a predetermined algorithm so long as the start value changes on each read cycle. Again, the reason for altering the start value of n is to maintain or expand channel bandwidth while concurrently providing a more even use of the memory channels. The use of multiple channel bandwidth over single channel bandwidth improves communications speed in transfer of data to or from memory.

The invention could be embodied in a memory controller that could form part of a processor (e.g., CPU, GPU, DSP, FPGA, etc.). Aspects of the invention could also be embodied in computer readable code. In some instances that computer readable code could be executable by a processor to perform methods and operations described herein. Code such as GDSII, RTL, etc. could be utilized so that when executed it would configure a manufacturing facility (such as a semiconductor fabrication facility) to create an integrated circuit (such as a processor or memory) that embodies aspects of the present invention.

While the invention has been shown and described with reference to specific embodiments, the method herein applies to any known computer system or multiple channel memory type, and it should be understood by those skilled in the art that various changes in form and detail may be made therein without departing from the scope of the invention.

What is claimed is:

1. A method for writing data to a multiple channel memory module, comprising:
    based on one or more factors, setting a first channel of the memory module to which first data is to be written;
    writing first data to the first channel of the memory module and in parallel simultaneously writing a first error correction code corresponding to the first data to a second channel of the memory module; and
    writing second data to the second channel and in parallel simultaneously writing a second error correction code corresponding to the second data to a third channel of the memory module.

2. The method of claim 1 wherein the third channel is a same channel as the first channel.

3. The method of claim 1 wherein the memory module is a through silicon via dynamic random access memory module.

4. The method of claim 1, wherein the one or more factors comprise at least one of:
    a bandwidth usage for each of the channels;
    a distribution of one or more previous writes among the channels; and
    an arrangement of data previously stored in the memory module.

5. The method of claim 1, wherein the first channel is set to a different channel for each of two or more write cycles, each write cycle comprising writing data to at least the first channel.

6. A method for reading data from a multiple channel memory module, comprising the steps of:
    based on one or more factors, setting a first channel of the memory module to which first data is to be read;
    reading first data from the first channel of the memory module and in parallel simultaneously reading first error correction code from a second channel of the memory module; and
    reading second data from the second channel of the memory module and in parallel simultaneously reading second error correction code corresponding to the second data from a third channel of the memory module.

7. The method of claim 6 wherein the third channel is a same channel as the first channel.

8. The method of claim 6 wherein the memory module is a through silicon via dynamic random access memory module.

9. A non-transitory computer-readable storage medium storing instructions that, when executed by a computing device, cause the computing device to perform a method, the method comprising:
    based on one or more factors, setting a first channel of the memory module to which first data is to be written;
    writing first data to a first channel of a memory module and, in parallel, writing a first error correction code for the first data to a second channel of the memory module; and
    writing second data to the second channel and, in parallel, writing a second error correction code for the second data to a third channel of the memory module.

10. The computer-readable storage medium of claim 9, wherein the method further comprises:
    reading the first data from the first channel of the memory module and, in parallel, reading the first error correction code for the first data from the second channel of the memory module; and
    reading the second data from the second channel of the memory module and, in parallel, reading the second error correction code for the second data from the third channel of the memory module.

11. The computer-readable storage medium of claim 9, wherein the first channel and the third channel are a same channel.

12. A non-transitory computer-readable storage medium storing instructions that, when executed by a manufacturing processor, cause the manufacturing processor to manufacture an integrated circuit, the integrated circuit adapted to perform a method comprising:
  based on one or more factors, setting a first channel of the memory module to which first data is to be written;
  writing first data to a first channel of a memory module and, in parallel, writing a first error correction code for the first data to a second channel of the memory module; and
  writing second data to the second channel and, in parallel, writing a second error correction code for the second data to a third channel of the memory module.

13. The computer-readable storage medium of claim 12, wherein the method further comprises:
  reading the first data from the first channel of the memory module and, in parallel, reading the first error correction code for the first data from the second channel of the memory module; and
  reading the second data from the second channel of the memory module and, in parallel, reading the second error correction code for the second data from the third channel of the memory module.

14. The computer-readable storage medium of claim 12, wherein the first channel and the third channel are a same channel.

15. The computer-readable storage medium of claim 12, wherein the instructions comprise at least one of GDSII, Verilog, HDL, or RTL.

* * * * *